(12) United States Patent
Caronni et al.

(10) Patent No.: US 7,751,569 B2
(45) Date of Patent: Jul. 6, 2010

(54) GROUP ADMISSION CONTROL APPARATUS AND METHODS

(75) Inventors: Germano Caronni, Mountain View, CA (US); Glenn C. Scott, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1078 days.

(21) Appl. No.: 10/299,454

(22) Filed: Nov. 19, 2002

(65) Prior Publication Data

US 2004/0096063 A1 May 20, 2004

(51) Int. Cl.
*H04L 9/00* (2006.01)
(52) U.S. Cl. ............ 380/277; 380/279; 380/444; 380/45; 380/281; 380/284; 713/163; 713/171; 713/155
(58) Field of Classification Search ............ 713/163, 713/171, 155; 380/278, 45, 281, 284, 279, 380/44, 277
See application file for complete search history.

(56) References Cited

U.S. PATENT DOCUMENTS

| | | | | |
|---|---|---|---|---|
| 4,531,020 A * | 7/1985 | Wechselberger et al. | .... | 380/239 |
| 4,613,901 A * | 9/1986 | Gilhousen et al. | ..... | 380/239 |
| 4,792,973 A * | 12/1988 | Gilhousen et al. | ..... | 380/231 |
| 6,049,878 A * | 4/2000 | Caronni et al. | ..... | 726/3 |
| 6,195,751 B1 * | 2/2001 | Caronni et al. | ..... | 713/163 |
| 6,393,128 B1 * | 5/2002 | Rix et al. | ..... | 380/283 |
| 6,782,475 B1 * | 8/2004 | Sumner | ..... | 713/163 |
| 6,941,457 B1 * | 9/2005 | Gundavelli et al. | ..... | 713/163 |
| 7,207,062 B2 * | 4/2007 | Brustoloni | ..... | 726/13 |
| 2002/0112154 A1 * | 8/2002 | Wallace, Jr. | ..... | 713/153 |
| 2003/0026273 A1 * | 2/2003 | Davison et al. | ..... | 370/409 |
| 2003/0035370 A1 * | 2/2003 | Brustoloni | ..... | 370/229 |
| 2003/0097571 A1 * | 5/2003 | Hamilton et al. | ..... | 713/182 |

OTHER PUBLICATIONS

Co-pending U.S. Appl. No. 09/458,021.*
Fiat et al. "Broadcast encryption." 1994, *Lecture Notes in Computer Science*, pp. 1-12 http://citeseer.nj.nec.com/cache/papers/cs/20701/http:zSzzSzwww.wisdom.weizmann.ac.ilzSz~naorzSzPAPERSzSzbroad.pdf/fiat94broadcast.pdf.
U.S. Appl. No. 09/458,021, filed Dec. 1999, Caronni et al.

\* cited by examiner

*Primary Examiner*—Kambiz Zand
*Assistant Examiner*—Tongoc Tran
(74) *Attorney, Agent, or Firm*—Marsh Fischmann & Breyfogle LLP; Kent A. Lembke (57) ABSTRACT

The present invention uses a group key management scheme for admission control while enabling various conventional approaches toward establishing peer-to-peer security. Various embodiments of the invention can provide peer-to-peer confidentiality and authenticity, such that other parties, such as group members, can not understand communications not intended for them. A group key may be used in combination with known unicast security protocols to establish, implicitly or explicitly, proof of group membership together with bi-lateral secure communication.

14 Claims, 6 Drawing Sheets

GROUP ADMISSION CONTROL APPARATUS AND METHODS

REFERENCE TO RELATED APPLICATIONS

The present invention relates to U.S. Pat. Nos. 6,049,878 and 6,195,751, both to Caronni et al. These patents are hereby incorporated by reference.

BACKGROUND

Communication among electronic devices has become commonplace and often serves as the mechanism for communication between parties. Electronic devices can be used for communicating among parties that are members of a group or are a subset of members of a group. Difficulties can arise in that communications and identities of parties often can not be trusted. Lack of trust can be caused by concerns such as communications being overheard by unauthorized parties or diverted to unintended recipients, contents changed without the knowledge of the communicating parties or communications originating from a source other than the apparent source.

Various forms of overcoming such concerns have been cumbersome to implement, not offered true identification of parties and/or required extensive communication among group members. Existing approaches to communications include the use of a group key distributed to members of the group. Group key management has been used to provide the combined functionality of confidentiality and authenticity on a group-wide basis. Typically, the group key is used to encrypt and decrypt various messages, and the ability of members to correctly encrypt or decrypt has been used as proof of membership of the group. Previous methods of implementing peer-to-peer confidentiality and authenticity of communications among the group members have also included certificate revocation lists, tickets issued by a central authority as in Kerberos and other approaches that require substantial communication among group members or substantial communication with a centralized authority.

Substantial communication requirements in conventional solutions may require a more robust communications capability in order to accommodate the periods of high overhead, such as at periods of group membership changes or other events, such as updating certificate revocation lists.

SUMMARY

The present invention uses a group key management scheme for admission control while optionally enabling various conventional approaches toward establishing peer-to-peer security. The invention may be used to separate admission control issues from providing confidentiality and authenticity by using a group key scheme to convey admission control information. Conventional approaches may be used to provide peer-to-peer confidentiality and authenticity. By not using the same group key for admission control, confidentiality and authenticity, the drawback of exposing all communications to all group members can be avoided.

Various embodiments of the invention can provide peer-to-peer confidentiality and authenticity, such that other parties, including other group members, cannot understand communications that are not intended for them. Furthermore, various embodiments of the invention can inhibit a group member from impersonating another party.

The invention may also provide a method of admission control by the use of a group key. According to this embodiment, proof of possession of a current group key is used to verify that they are members of the group.

According to an embodiment of the invention, a method is provided for admission control for a group. The method may include the steps of possessing a key and providing proof of possession of the key to verify membership of the group.

According to an embodiment of the invention, a method for admission control for a group having a group key is provided, having the step of sending a first key and a second key to a first party. The first key is also sent to a plurality of members of the group. According to this embodiment, the first key is an update of the group key and the second key is unique to the first party.

According to another embodiment of the invention, a method for admission control for a group having a group key is provided, having the step of sending a first key and a second key to a first party. In this case, the first key is a hashed key of the group key and the second key is unique to the first party.

A further embodiment involves an electronic device having an admission control facility for controlling access to a group using a group key. In this embodiment, the admission control facility is provided with means for receiving a request from a first party for admission to the group and means for sending a first key and a second key, wherein the first key is an update of the group key and is sent to a plurality of members of the group and wherein the second key is unique to the first party and is sent exclusively to the first party.

Another embodiment of the invention also involves an electronic device. In this embodiment, the admission control facility has means for receiving a request from a first party for admission to the group and means for sending a first key and a second key, wherein the first key is a hashed key of the group key and is sent to the first party and wherein the second key is unique to the first party and is sent exclusively to the first party.

An electronic device is provided in another embodiment of the invention, having an admission control facility for controlling access to a group using a group key. The admission control facility has a receiver adapted to receive a request from a first party for admission to the group. The admission control facility also has a sender adapted to send a first key and a second key, wherein the first key is an update of the group key and is sent to a plurality of members of the group and wherein the second key is unique to the first party and is sent exclusively to the first party.

A further embodiment of the invention involves an electronic device having an admission control facility for controlling access to a group using a group key. The admission control facility is provided with a receiver adapted to receive a request from a first party for admission to the group and a sender adapted to send a first key and a second key, wherein the first key is a hashed key of the group key and is sent to the first party and wherein the second key is unique to the first party and is sent exclusively to the first party.

Further embodiments of the invention involve an electronic device or a storage medium holding computer-executable instructions for performing a method including the steps of sending a first key and a second key to a first party and sending the first key to a plurality of members of the group. According to this embodiment, the first key is an update of the group key and the second key is unique to the first party.

Further embodiments of the invention involve an electronic device or a storage medium holding computer-executable instructions for performing a method, comprising the step of sending a first key and a second key to a first party. According to this embodiment, the first key is a hashed key of the group key and the second key is unique to the first party.

BRIEF DESCRIPTION OF THE DRAWINGS

The invention will be apparent from the description herein and the accompanying drawings, in which like reference characters refer to the same parts throughout the different views.

DETAILED DESCRIPTION

Figure 1:
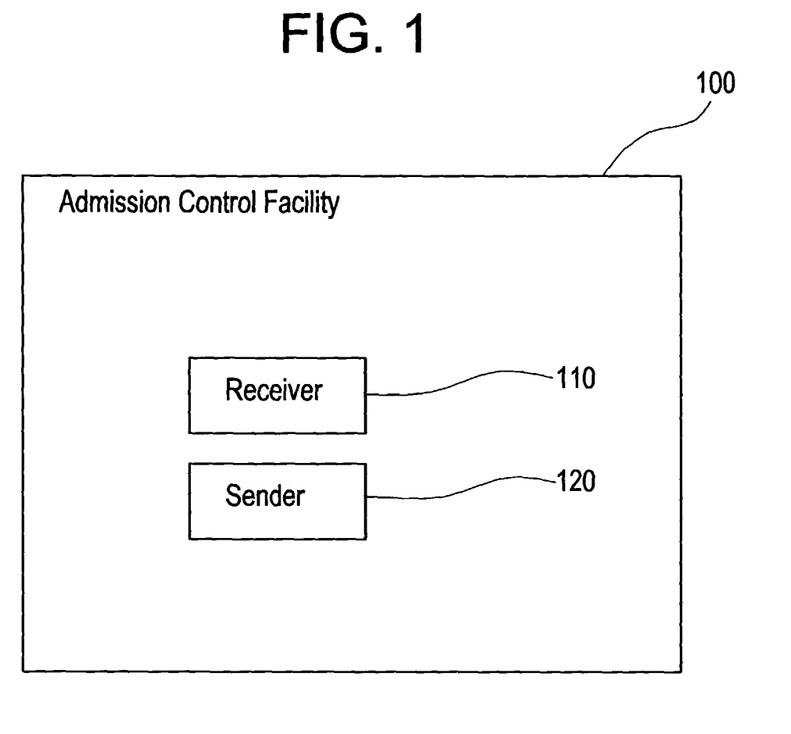
FIG. 1 is a block diagram of an admission control facility according to an embodiment of the invention.

According to one embodiment of the invention, an admission control facility 100 is provided as illustrated by way of example in FIG. 1. The admission control facility 100 is optionally provided with a receiver 110 and with a sender 120. The receiver 110 and sender 120 may be adapted to communicate on a variety of communication systems. Examples of such communication systems include a computer network and a telecommunications network. The network may be partially or completely a wireless, wired or an optical network or a combination thereof. Examples of the network may include a Bluetooth network, a cellular network, a GSM based network, a local area network (LAN), a wide area network (WAN), the Internet, an intranet, or a metropolitan network or some other type of network, although the invention is not so limited and may be used with any type of communications system allowing electronic devices to communicate.

The admission control facility 100 may be a computer system or other type of electronic device. As used herein, an electronic device may be wide variety of devices capable of processing signals or information, such as a processor, a computer, a personal digital assistant, a communications device, such as a cell phone, an intelligent appliance, a network appliance, a web server, a network, any device capable of manipulating information, a receiver, a transmitter, an interface or any combination of these devices. Examples of computers may include a personal computer, a network computer, or workstation.

The admission control facility 100 optionally possesses storage capacity that may be implemented using a number of different types of storage technology, including read-only memory (ROM), random access memory (RAM), secondary storage media, such as optical disks, magnetic disks or other types of storage technologies. According to an alternative embodiment, the admission control facility 100 may be configured to interface with an external storage capacity.

Figure 2:
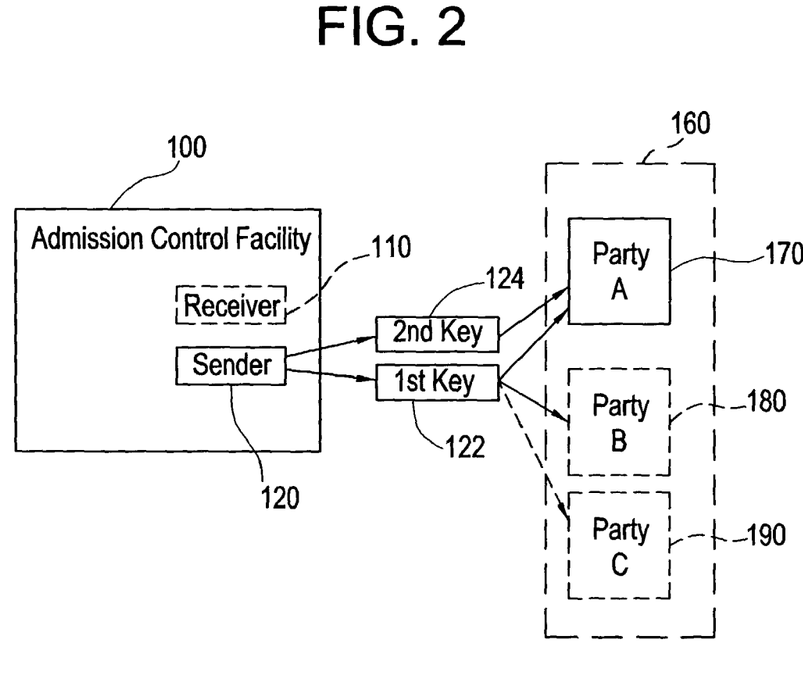
FIG. 2 illustrates a communication protocol between an admission control facility and a group according to an embodiment of the invention.

As illustrated in FIG. 2, a further embodiment of the invention is shown having at least one admission control facility 100 in communication with one or more members of a group 160. The invention may optionally include multiple admission control facilities 100. The admission control facility 100 is provided with a sender 120. The sender 120 is adapted to send a first key 122 and a second key 124 to at least one member of the group 160, such as party A 170. It is understood that party A 170, party B 180 and party C 190 are representative of electronic devices associated with one or more parties.

The group 160 may consist of one or more members. For purposes of illustration, the group 160 is shown including party A 170 and optionally including party B 180 and party C 190. However the invention is not so limited, and the group 160 may consist of tens, hundreds, thousands or millions of members.

Figure 3:
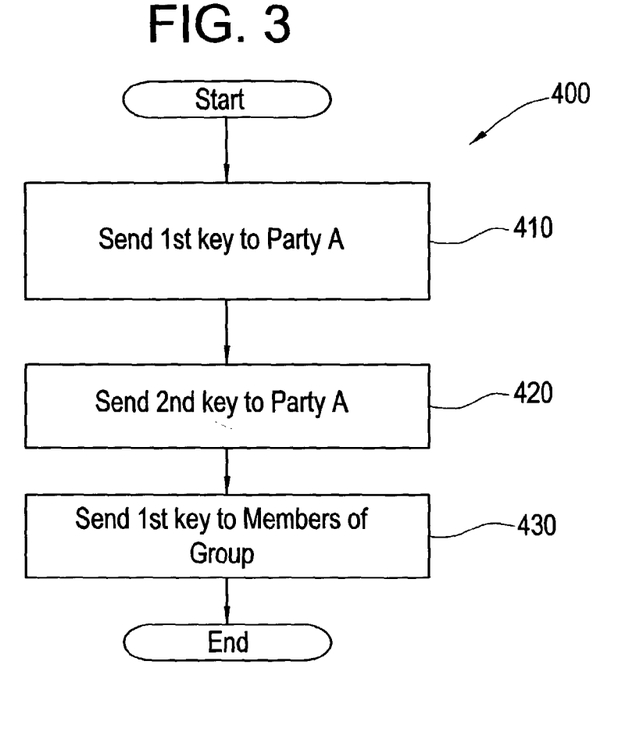
FIG. 3 illustrates a method of operation of the embodiment of FIG. 2.

In operation, the embodiment of the invention, illustrated by way of example in FIG. 2, may operate according to the sample method 400 of FIG. 3. The admission control facility 100 sends a first key to party A, step 410. A second key is also sent to party A, step 420. The admission control facility 100 also sends the first key 122 to at least one other member of the group 160, step 430. While these steps of the invention have been recited in a particular order, for purposes of illustration, the invention is not so limited. The first key 122 and second key 124 may be sent simultaneously or in any order. According to this embodiment of the invention, the first key 122 is an update of a group key used by the group 160 and the second key 124 is sent only to party A 170. The keys may be sent according to any method known in the art. See U.S. Pat. Nos. 6,049,878 and 6,195,751 or A. Fiat et al., *Broadcast Encryption*, Advances in Cryptology—CRYPTO '93 Proceedings, Lecture Notes in Computer Science, Vol. 773, 1994, pp. 480-91 for examples.

To update the group key, a message may be sent by the admission control facility 100 to members of the group 160 that are to remain in the group 160. See U.S. Pat. No. 6,049,878, the contents of which are incorporated herein by reference. Optionally, messages transmitted by the admission control facility 100 may be encrypted and/or include a revision number of the current group key, allowing members of the group 160 to compare the revision number of the group key currently being transmitted with the most recent group key received by that member.

The group key may optionally be put through a one-way function after a pre-determined amount of time to prevent access to earlier messages by newcomers. An example one-way function is the MD5 algorithm, the secure hash algorithm (SHA) or an equivalent. In one embodiment, the group key is put through a one-way function every ten minutes.

In order to add a new party to the group 160, the new party would contact an admission control facility 100. The new party would receive information back from the admission control facility 100. A second key 124 would be specific to the new party while the first key 122 would be a group key. The admission control facility 100 would then send a message to the other members of the group 160 to update the group key.

The invention may be used to separate admission control issues from providing authenticity and confidentiality by using a group key scheme to convey admission control information. Conventional approaches may be used to provide peer-to-peer confidentiality and authenticity. By not using a group key for confidentiality and authenticity, the drawback of exposing all communications to all group members can be avoided.

Security of communications may be established by the use of conventional methods. Examples include SKIP (Simple Keymanagement for Internet Protocols), a Sun key management protocol, or IPSEC/IKE (Internet Key Exchange) or SSL (Secure Socket Layer).

Optionally, the key used between members of the group 160 may be mixed with the current group key, thereby proving its possession to other group members, and thus the right to participate in the group. By way of example, in versakey the group authentication token is known as a traffic encryption key (TEK). Therefore for SKIP, the actual encryption key is a hash of (E_kp|| TEK) and the authentication key is a hash of (A_kp|| TEK). In order to remove a member from the group 160, the admission control facility 100 issues a new group key to those members of the group that are to remain in the group 160. Therefore, those members removed from the group will be unable to decrypt future group messages and will be unable to provide appropriate responses to challenges by other members for an appropriately encrypted reply. According to an optional embodiment of the invention, the revision number of the group key may be included with each message. In such a case, those members removed from the group could then determine that they no longer have the current group key.

In operation, members of the group 160 may challenge others to transmit an encrypted reply reflective of the current group key. Such encryption may also be used in conjunction with other encryption techniques.

Figure 4:
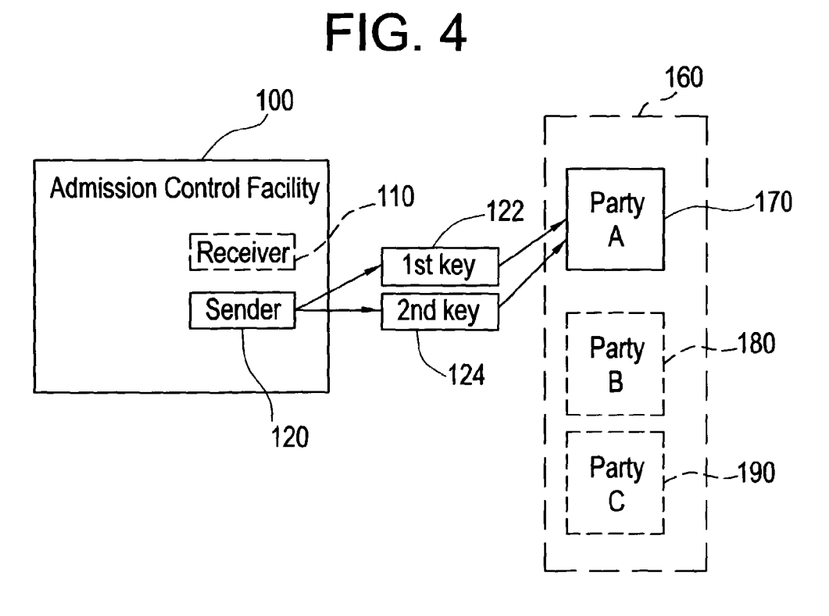
FIG. 4 illustrates communication between an admission control facility and a group according to a further embodiment of the invention.
Figure 5:
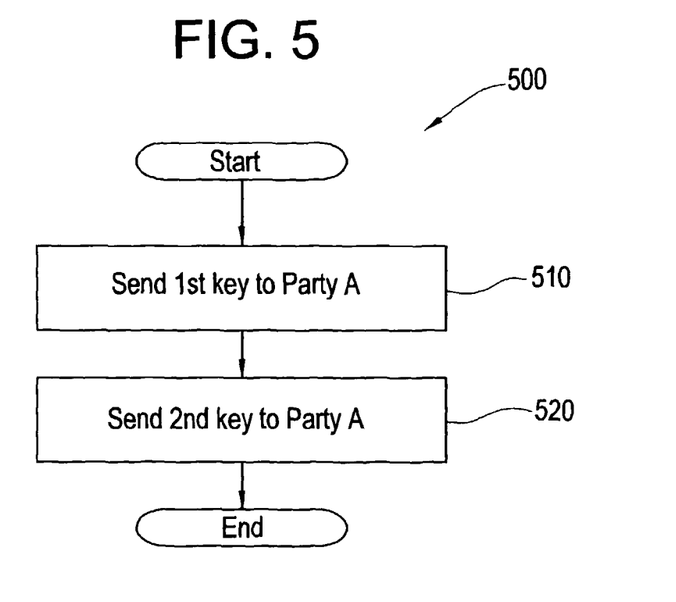
FIG. 5 illustrates a method of operation of the embodiment of FIG. 4.

A further embodiment is illustrated in FIG. 4 and may operate according to the sample method 500 of FIG. 5. According to the embodiment of FIG. 4, the admission control facility 100 sends a first key 122 to party A 170 of group 160, step 510. The admission control facility 100 also sends a second key 124 to party A 170, step 520. The admission control facility 100 may send the first key 122 and second 124 in any order to party A 170. According to this embodiment of the invention, the first key 122 is a hashed key of the group key used by the group 160. The second key 124 is sent only to party A 170 of the group 160. Because the first and second keys 122, 124 are sent to party A 170 and need not be sent to other members of the group 160, this embodiment of the invention can avoid the need for multiple members of the group 160 to communicate with a centralized authority whenever a member is added to the group 160. In this case, other members of the group 160 are aware of the hash function used to hash the first key 122 and therefore are able to recognize the hashed key of the group key.

According to the embodiment of FIGS. 4 and 5, the group key need not be updated upon the addition of a new member to the group 160. Instead, the party newly joining the group is provided with a hashed key. The hashed key may prevent the new member to the party from accessing messages or activities among group members prior to admission of the new member to the group.

Figure 6:
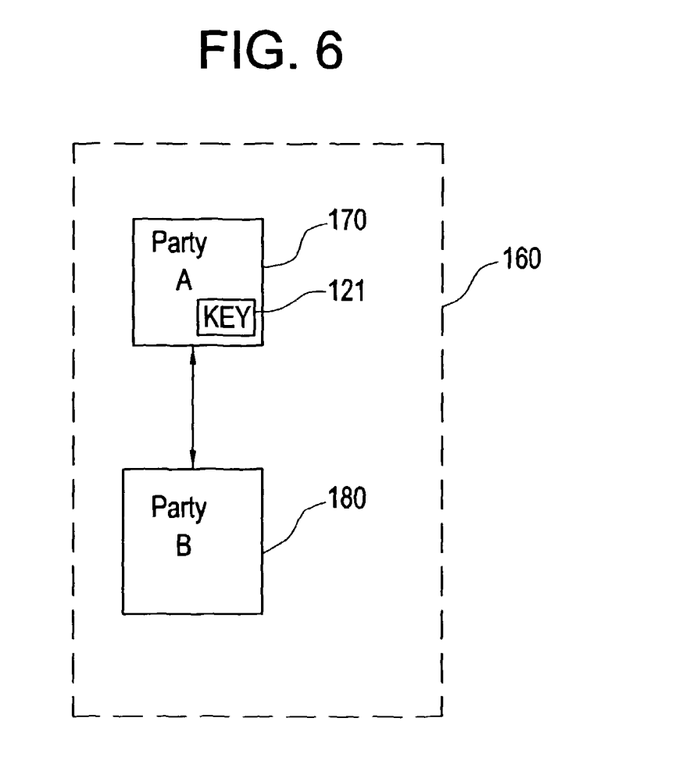
FIG. 6 illustrates an implementation of an embodiment of the invention.
Figure 7:
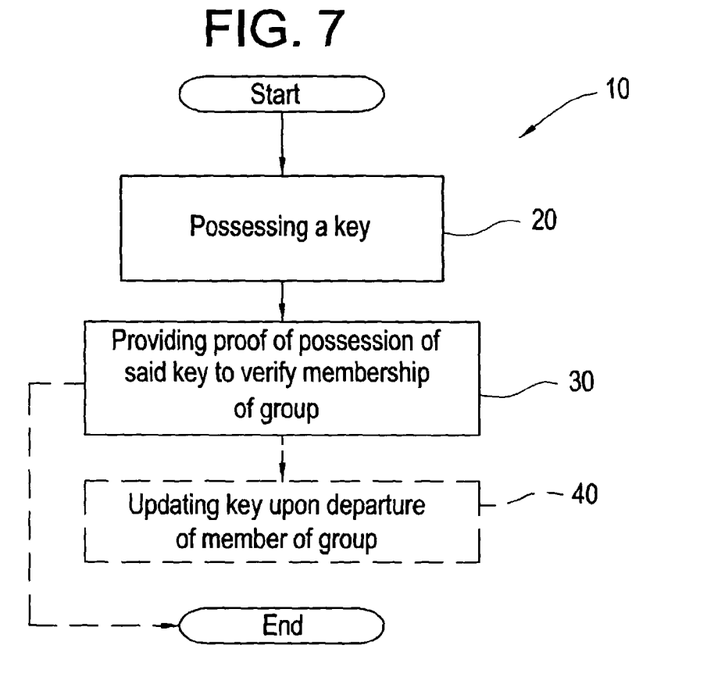
FIG. 7 illustrates a method according to an embodiment of the invention.

FIG. 6 illustrates another embodiment of the invention. FIG. 6 shows Party A 170 and Party B 180 as members of a group 160. Party A 170 possesses a key 121, such as a group key. In operation, as shown in FIG. 7, a method 10 may include the step 20 of possessing the key 121. The key 121 may be distributed to group members according to any method known in the art. See U.S. Pat. Nos. 6,049,878 and 6,195,751 and A. Fiat et al., *Broadcast Encryption*, Advances in Cryptology—CRYPTO '93 Proceedings, Lecture Notes in Computer Science, Vol. 773, 1994, pp. 480-91 for examples.

The method further involves the step 30 of providing proof of possession of the key 121 to verify membership of the group 160. The providing proof of possession of the key 121 may be done explicitly by showing the key 121 to another member of the group 160 and/or to an admission control facility 100. An alternative for providing proof of possession of the key 121 involves receiving a challenge and replying to the challenge. An example of this alternative is appending the key to a received message and returning the message. A further example is processing and returning a message through a one-way function using the key 121. Providing proof of possession of the key 121 may also be done implicitly by peers, such as Party A 170 and Party B 180 negotiating a common key for communications then hashing the common key together with the key 121. The hashing may be done at any time, including the beginning of negotiations and the end of negotiations.

In summary, the key 121, such as a group key, may be used according to the invention in combination with known unicast security protocols to establish, implicitly or explicitly, proof of group membership together with bi-lateral secure communication.

By the use of the invention, Party A 170 need not disclose its identity in order to provide proof of membership in the group 160. Similarly, Party B 180 also need not disclose its identity in determining the group membership status of Party A 170.

Optionally, the key 121 may be updated upon the departure of a member from the group 160, step 40. As noted above, the key 121 may be distributed to group members according to any method known in the art.

Figure 8:
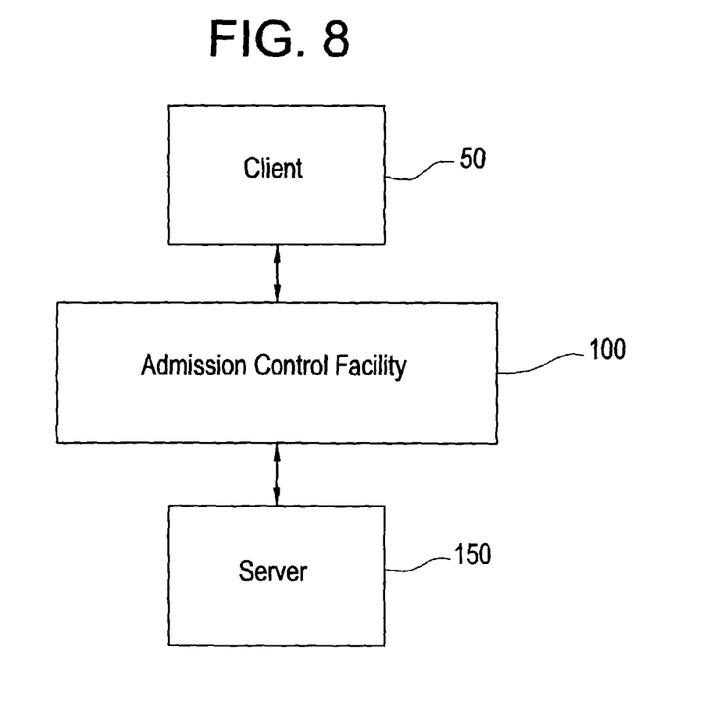
FIGS. 8-10 illustrate various implementations of admission control facilities according to various embodiments of the invention.

According to further embodiments of the invention, the admission control facility 100 may be coupled between a client 50 and server 150, as illustrated in FIG. 8.

A further embodiment of the invention is illustrated in FIG. 8. The admission control facility 100 may be positioned between a client 50 and a server 150. The admission control facility 100 may be used to enable or prohibit communication between the client 50 and the server 150. In this embodiment, the admission control facility 100 functions as an intermediary that mediates and/or processes communications between the client 50 and the server 150.

Figure 9:
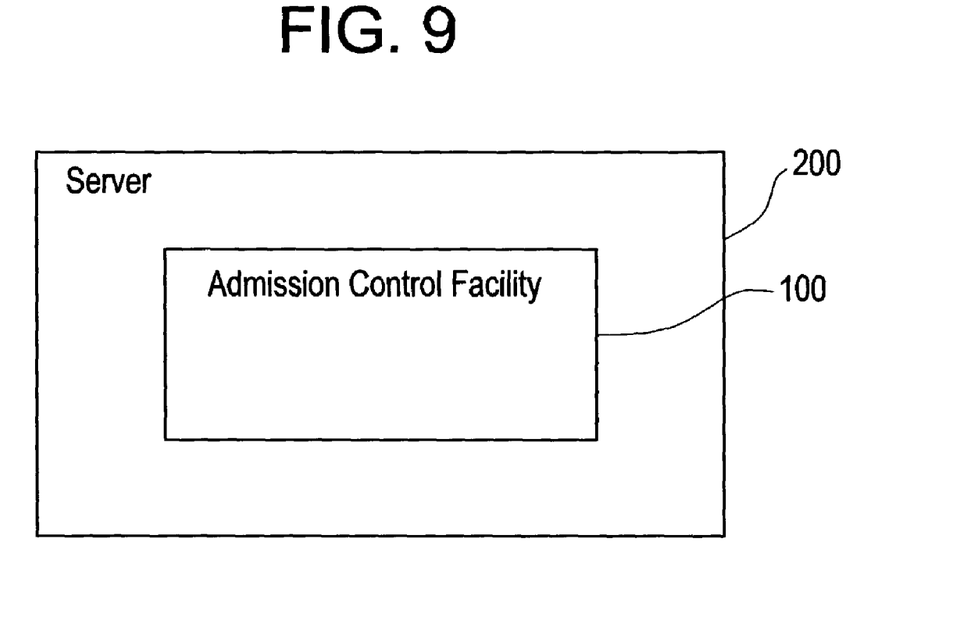
Figure 10:
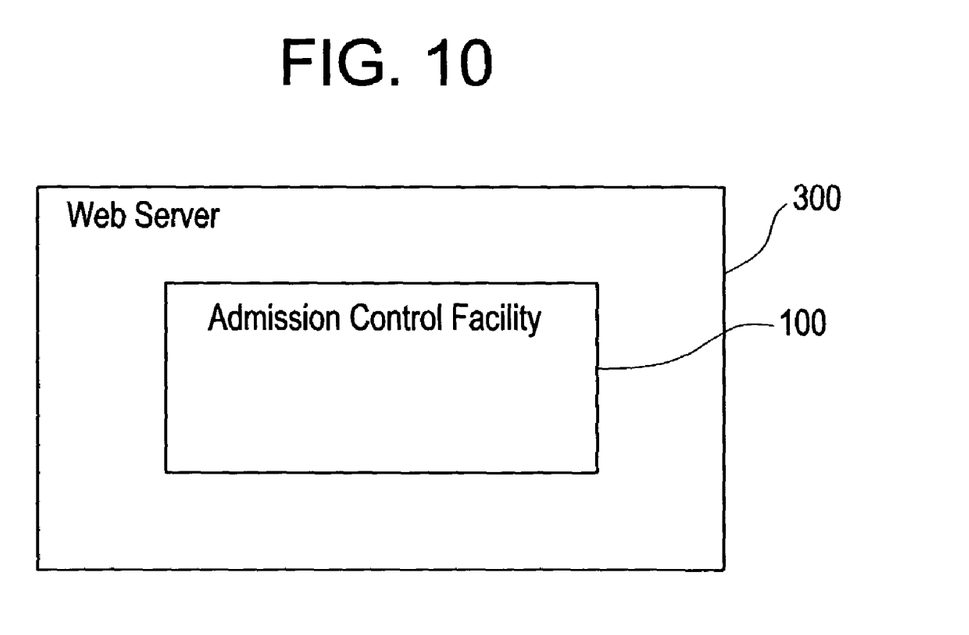

Further embodiments of the invention are illustrated in FIGS. 9-12. FIG. 9 illustrates an admission control facility 100 within a server 200. FIG. 10 illustrates an admission control facility 100 within a web server 300. In each of these embodiments, the admission control facility 100 may communicate with other electronic devices in communication with the server 200 or web server 300. The admission control facility 100 operate concurrently with other functionality hosted by the server 200 or web server 300.

Figure 11:
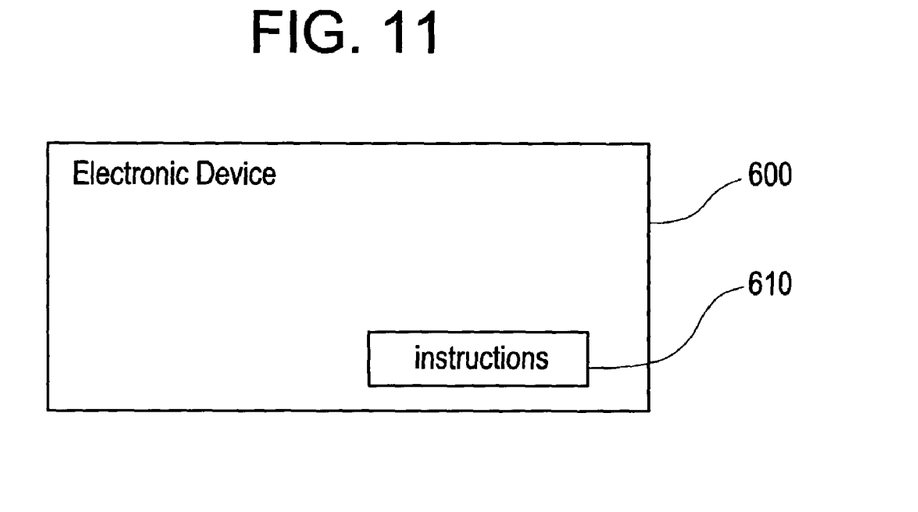
FIG. 11 illustrates an electronic device according to a further embodiment of the invention.

As noted above an electronic device may be a wide variety of devices capable of processing signals or information. The electronic device 600 of FIG. 11 is further provided with a storage capability for holding the computer-executable instructions 610. The electronic device 600 is adapted to communicate with other electronic devices in order to perform methods according to various embodiments of the invention.

Further embodiments of the invention include an electronic device 600 holding computer-executable instructions 610 for performing a method according to various embodiments of the invention as shown in FIG. 11.

Figure 12:
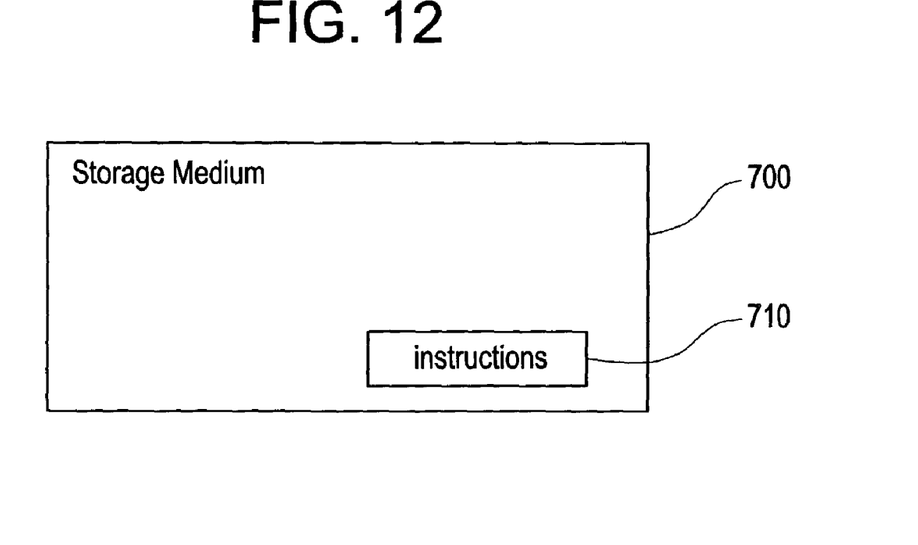
FIG. 12 illustrates a storage medium holding computer-executable instructions for performing a method according to various embodiments of the invention.

As illustrated in FIG. 12, a further embodiment of the invention involves a storage medium 700 having computer-executable instructions 710 for executing various methods according to the invention. The storage medium 700 may be formed of a wide variety of technologies. Examples of these technologies include ROM, RAM, secondary storage media, such as optical disks, magnetic disks or other types of storage technologies adapted to store computer-executable instructions 710.

These examples are meant to be illustrative and not limiting. As described herein, the terms positioning mechanism and adjustment mechanism are considered to be interchangeable.

The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

1. A method for admission control for a group, said group comprising a plurality of members and having a group key used for encryption of messages, said method comprising the steps of:
   a first party to be admitted to the group:
      receiving, from a group administrator, a first key, wherein said first key is an updated group key, said updated group key being sent from the administrator, to the plurality of members;
      receiving, from the group administrator, a second key unique to said first party; and
      verifying group membership by receiving a challenge and replying to said challenge, wherein said replying to said challenge is performed by modifying data by the use of a one-way function having said first key as an input.

2. The method of claim 1, wherein said first key is updated at least once during a predetermined time interval.

3. The method of claim 1, wherein said step of verifying group membership is performed anonymously.

4. A method for admission control for a group, said group comprising a plurality of members and having a group key used for encryption of messages, said method comprising the steps of:
   enabling a first party to verify group membership to at least one of the plurality of members by:
      sending a first key to the first party, wherein said first key is an updated group key;
      sending a second key to said first party; and
      sending said first key to the plurality of members of said group; wherein
         said second key is unique to said first party,
   wherein,
      said first party verifies group membership by receiving a challenge and replying to said challenge, said replying to said challenge is performed by modifying data by the use of a one-way function having said first key as an input.

5. The method of claim 4, wherein said first key is updated at least once during a predetermined time interval.

6. An electronic device, comprising:
   an admission control facility for controlling access to a group, said group comprising a plurality of members and having a group key used for encryption of messages, said admission control facility comprising:
   a receiver adapted to receive a request from a first party for admission to said group; and
   a sender adapted to enable said first party to verify group membership to at least one of the plurality of members by sending a first key and a second key to said first party, wherein
   said first key is an updated group key and is sent to said plurality of members;
   said second key is unique to first said party and is sent exclusively to said first party; and
      said first party verifies group membership by receiving a challenge and replying to said challenge, said replying to said challenge is performed by modifying data by use of a one-way function having said first key as an input.

7. The electronic device of claim 6, wherein said first key is updated upon addition of at least one member to said group.

8. The electronic device of claim 6, wherein said first key is updated upon removal of at least one member from said group.

9. The electronic device of claim 6, wherein said sender is adapted to send said first key at least once during a predetermined time interval to said members of said group.

10. The electronic device of claim 6, wherein said first key is updated at least once during a predetermined time interval.

11. The electronic device of claim 6 wherein the admission control facility is a server.

12. The electronic device of claim 6 wherein the admission control facility is a web server.

13. The electronic device of claim 6 wherein the admission control facility is an intermediary between a client and a server.

14. An electronic device holding computer-executable instructions for performing a method of admission control for a group, comprising the steps of:
   enabling a first party to verify group membership to at least one of the plurality of members by:
      sending a first key to the first party, wherein said first key is an updated group key;
      sending a second key to said first party; and
      sending said first key to the plurality of members of said group; wherein
         said second key is unique to said first party,
   wherein,
      said first party verifies group membership by receiving a challenge and replying to said challenge, said replying to said challenge is performed by modifying data by the use of a one-way function having said first key as an input.

* * * * *